June 10, 1947.  G. F. YAGER  2,422,061
SPINDLE STRUCTURE
Filed Dec. 27, 1943   2 Sheets-Sheet 1
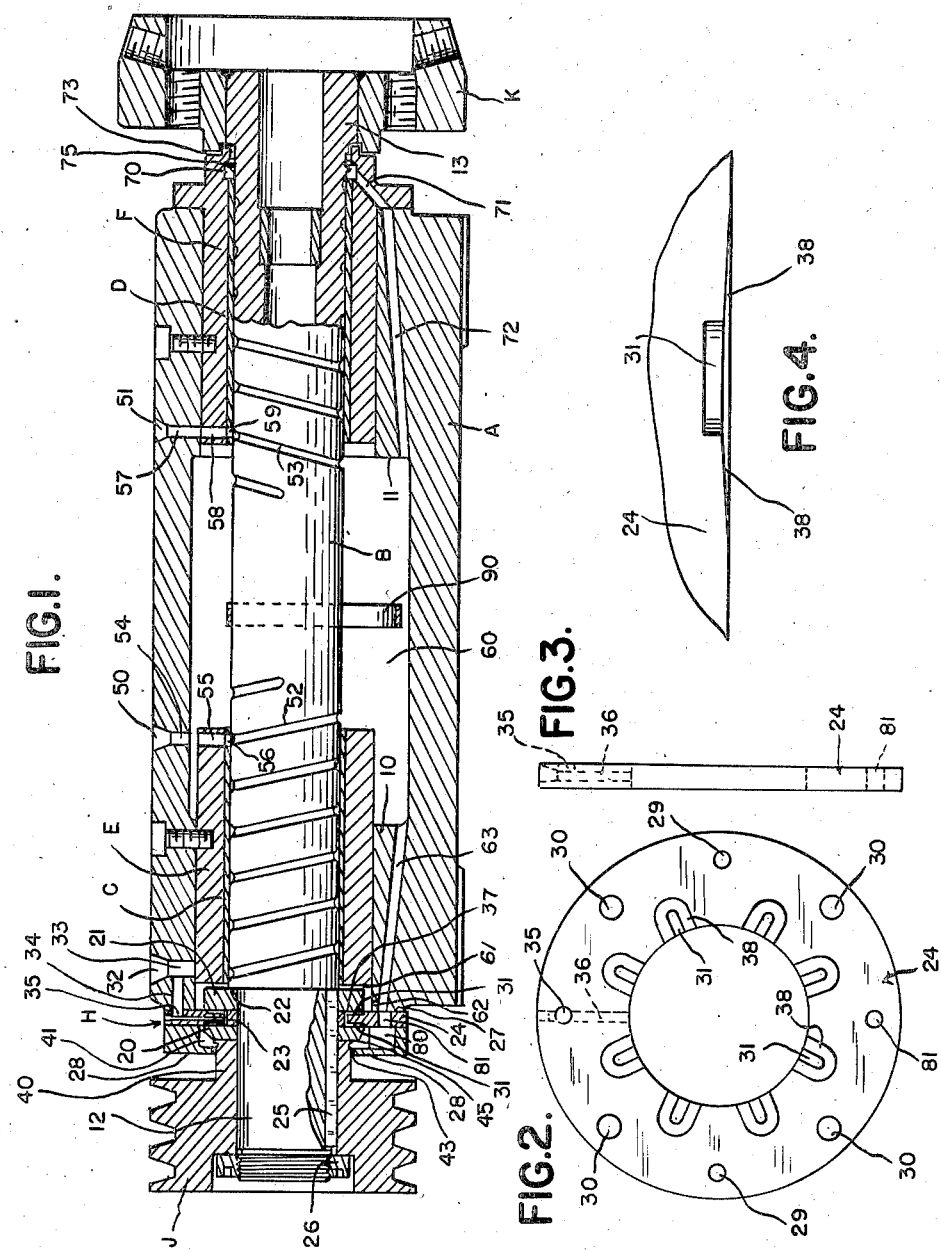
INVENTOR.
GEORGE F. YAGER
BY
*Whittemore, Hulbert & Belknap*
ATTORNEYS June 10, 1947.  G. F. YAGER  2,422,061
SPINDLE STRUCTURE
Filed Dec. 27, 1943  2 Sheets-Sheet 2
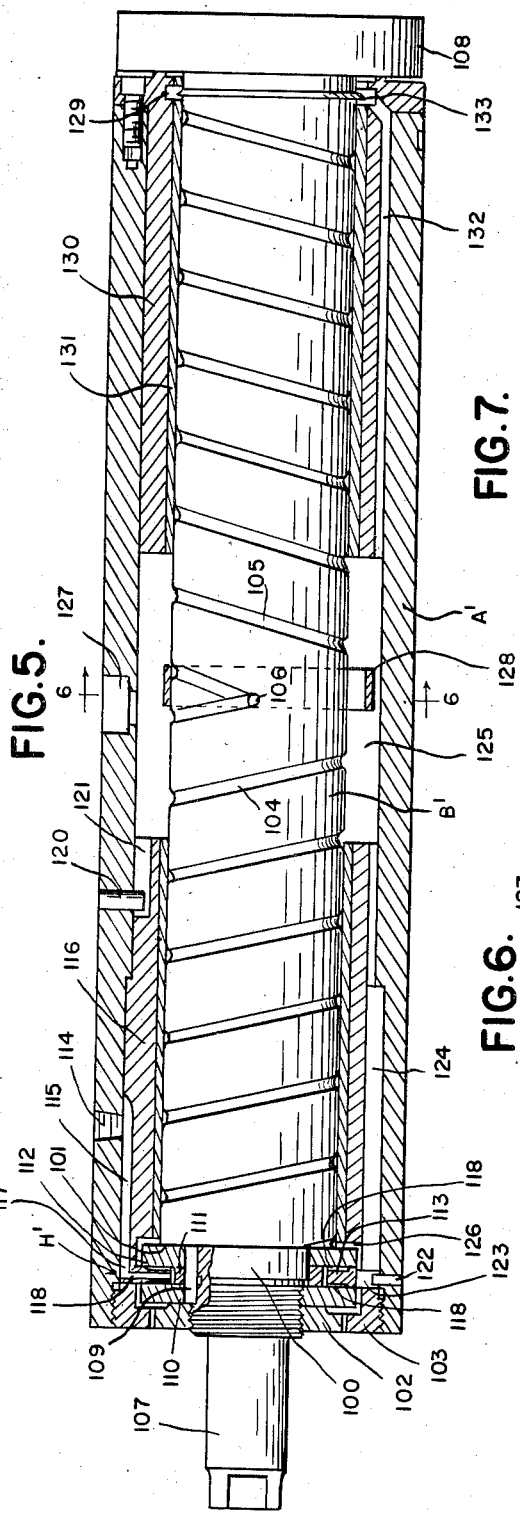
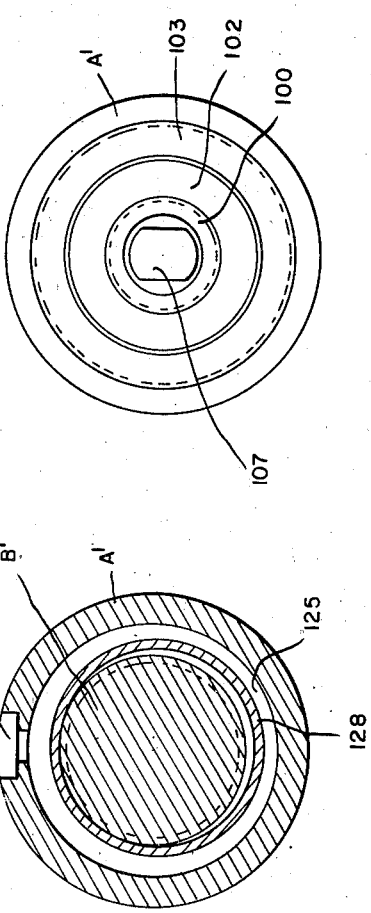
*INVENTOR.*
GEORGE F. YAGER
BY
*ATTORNEYS*

Patented June 10, 1947

2,422,061

UNITED STATES PATENT OFFICE 2,422,061

SPINDLE STRUCTURE

George F. Yager, Toledo, Ohio, assignor to Bunting Brass & Bronze Company, Toledo, Ohio, a corporation of Ohio Application December 27, 1943, Serial No. 515,776

11 Claims. (Cl. 308—172)

This invention relates generally to spindle assemblies and refers more particularly to an improved spindle assembly adapted for use in boring, turning, facing, or grinding machines for carrying and driving the chuck or holder for the work.

One of the essential objects of the invention is to provide an assembly of the plain bearing type that avoids the use of ball bearings and that will outlast and outrun spindle assemblies of the ball bearing type.

Another object is to provide an assembly having an improved bearing structure and lubricating system for the rotating spindle.

Another object is to provide an assembly that is better for precision work.

Another object is to provide an assembly that comprises fewer parts, is less expensive to manufacture, is less likely to require service, and has elements that may be easily repaired or replaced.

Another object is to provide an assembly wherein the rotatable element or spindle is mounted in such a way that it has an immense load carrying capacity and is capable of operating without deflection.

Other objects, advantages and novel details of construction of this invention will be made more apparent as this description proceeds, especially when considered in connection with the accompanying drawings, wherein:

Figure 1 is a longitudinal vertical sectional view through an assembly embodying my invention;

Figure 2 is a detail elevational view of the thrust washer of the thrust bearing assembly;

Figure 3 is an edge elevation of the washer illustrated in Figure 2;

Figure 4 is an enlarged fragmentary view showing one of the oil grooves and bevelled edges illustrated in Figure 2;

Figure 5 is a view similar to Figure 1 but showing a slight modification;

Figure 6 is a sectional view taken substantially on the line 6—6 of Figure 5;

Figure 7 is an end view of the structure illustrated in Figure 5.

Referring to the drawings, A is the housing, B is the spindle, C and D respectively are plain tubular bearings for the spindle, E and F respectively are sleeves for the tubular bearings, H is a thrust bearing assembly for the spindle, J is a drive pulley for the spindle, and K is a chuck holder of a spindle assembly embodying my invention.

As shown the housing A is substantially tubular in form and is provided at opposite ends thereof with inwardly projecting annular enlargements 10 and 11 for the reception of the tubular bearings C and D and sleeves E and F therefor.

The spindle B is mounted to turn in the bearings C and D and projects beyond opposite ends of the housing A. The drive pulley J is keyed upon a reduced end portion or endwise extension 12 of the spindle, while the chuck holder K is sleeved upon and welded to an enlarged end portion 13 of the spindle.

The thrust bearing assembly H for the spindle has two washers 20 and 21 respectively of substantially uniform diameter keyed in longitudinally spaced relation upon the reduced portion 12 of the spindle between a shoulder 22 thereof and the pulley J, a spacing washer 23 of smaller diameter also keyed on the reduced portion 12 of the spindle between the washers 20 and 21, and a thrust washer 24 fixed to the housing A and encircling the spacing washer 23.

Preferably a single key 25 extending lengthwise of the reduced portion 12 of the spindle serves as a common connector between the spindle, pulley J and washers 20, 21 and 23, while a single nut 26 threaded on the outer end of the reduced portion 12 of the spindle holds the pulley J and washers 20, 21 and 23 in assembled relation relative to the shoulder 22 of the spindle.

The thrust washer 24 is clamped between the adjacent end 27 of the housing and a collar 28 bolted thereto. Suitable dowels (not shown) projecting endwise from the housing A engage holes 29 in the thrust washer 24 and other holes (not shown) in the collar 28 to position the thrust washer 24 and collar 28 in proper relation to the housing A, while suitable bolts (not shown) also carried by the housing engage holes 30 in the thrust washer 24 and other holes (not shown) in the collar 28 to hold the washer and collar on the dowels.

In the present instance opposite sides of the thrust washer 24 are provided in opposed relation to the washers 20 and 21 with radially extending grooves 31 that are adapted to be supplied with oil for lubricating purposes from an oil inlet 32 in the housing A. Preferably oil from this inlet flows through passages 33 and 34 in the housing and through passages 35 and 36 in the thrust washer to the space 37 between said washer 24 and the spacing washer 23 and thence to the oil grooves 31.

As shown in Figures 2 and 4, the edges of these grooves 31 are bevelled laterally at 38 so that the oil supplied to the grooves may spread laterally over the opposed faces of the washers 20, 24 and 21. Inasmuch as the thrust washer 24 is held by the dowels and bolts mentioned in proper assembled relation to the housing, the oil passage 35 in the washer 24 will be held in proper registration with the passage 34 in the housing A to insure proper supply of oil to the grooves 31 aforesaid.

The collar 28 encircles an annular part 40 of the pulley and is recessed at 41 to receive the outermost washer 20. To prevent oil in this recess 41 leaking out or escaping through the clearance 43 between the pulley J and collar 28, the annular part 40 of the pulley is provided within the recess 41 with an annular rib 45 that constitutes an oil slinger for throwing the oil away from such clearance space.

In addition to the oil inlet 33, there are two other inlets 50 and 51 respectively at longitudinally spaced points of the housing A for supplying oil to oppositely extending spiral grooves 52 and 53 respectively in the spindle B. Preferably oil from the inlet 50 is fed through registering passages 54, 55 and 56 respectively in the housing A, sleeve E and tubular bearing C to the spiral groove 52, while oil from the inlet 51 is fed through registering passages 57, 58 and 59 respectively in the housing A, sleeve F and tubular bearing D to the spiral groove 53. Thus oil is spread over the working surfaces of the tubular bearings C and D as the spindle B is rotating. In this connection the edges, especially the trailing edge, of each spiral groove, are rounded to facilitate the spread of oil over such working surfaces.

Oil discharged from the spiral grooves 52 and 53 is conducted to a sump 60 at the center of the housing A. For example, oil from the spiral groove 52 will work endwise between the tubular bearing C and spindle B to an annular space 61 of L cross-section between the sleeve E and thrust bearing assembly H, thence through a hole 62 in the housing A to an inclined passage 63 leading to the sump 60. Oil from the spiral groove 63 will work endwise between the tubular bearing D and spindle B to an annular space 70 between sleeve F and spindle B, thence through an inclined passage 71 in the sleeve F to an inclined passage 72 in the housing A leading to the sump 60. To prevent oil in the space 70 leaking out or escaping through the clearance 73 between the sleeve F and chuck holder K, the spindle B is provided in the space 70 with an annular rib 75 that constitutes an oil slinger for throwing the oil away from such clearance space.

Oil from the thrust bearing assembly H is also conducted to the sump 60. For example, oil working from the opposed surfaces of the washers 20, 24 and 21 will be received in a slot or recess 80 in the collar 28 and will flow from such recess through a hole 81 in the thrust washer to the inclined passage 63 in the housing A. When the parts are assembled, the dowels for the thrust washer 24 and collar 28 will provide proper positioning of such elements relative to the housing so that the hole 81 in the thrust washer 24 will register with the inclined passage 63 in the housing, and the recess 80 in the collar will register with the hole 81 in the thrust washer.

A ring 90 of greater diameter than the spindle B is loose on the spindle within the sump 60 and cooperates with the spindle during rotation thereof to facilitate the transfer of oil from the sump via the spiral grooves 52 and 53 to the working surfaces of the tubular bearings C and D. In use, the housing A may be mounted by any suitable means (not shown) upon or within the frame of the machine in which it is to be employed. After the drive pulley J is connected to a suitable source of power and the work holding chuck (not shown) is attached to the holder K, the rotation of the spindle B may be effected so that the work may be engaged by the desired tool to obtain the proper boring, turning, facing or grinding operation. While the spindle is rotating oil may be supplied to the inlets 32, 50 and 51 respectively of the lubricating system so that the rotation of the spindle B will be smooth. In fact the lubrication is such that the spindle B has an immense load carrying capacity without deflection. Thus I have provided a more rigid assembly that avoids chatter and permits a finer and more precise tool operation to be obtained in close limits on the work.

In Figures 5 to 7 inclusive I have illustrated a slight modification wherein a quill A' is employed as the housing, the thrust bearing assembly H' is on a reduced portion 100 of the spindle B' between a shoulder 101 thereof and a pair of cooperating nuts 102 and 103 respectively at one end of the quill, and the spiral grooves 104 and 105 extend in opposite directions from a central point 106 of the rotatable spindle. Aside from these and a few minor changes which will be described, the assembly is essentially the same as that illustrated in Figures 1 to 4 inclusive.

In this construction a drive pulley (not shown) is adapted to be fixed to the projecting end 107 of the spindle, while a chuck or work holder (not shown) is adapted to be attached to the head 108 of the spindle.

109 is a key by which the washers 110, 111 and 112 respectively of the thrust bearing are connected to the reduced portion 100 of the spindle.

The nut 102 threadedly engages the reduced portion 100 of the spindle at the outer end of the key 109 and serves as an outer abutment for the outer washer 110, while the nut 103 encircles the nut 102 and threadedly engages the quill A' at the outer side of the thrust washer 113.

Oil from the inlet 114 flows through a passage 115 in the sleeve 116 to connecting passages 117 and 118 in the thrust washer 113, thence between the washers 111 and 113 to the radially extending grooves 118 in opposite sides of the thrust washer 113. Such grooves 118 may be similar to the grooves 31 illustrated in Figures 2 and 4 and therefore may have bevelled edges corresponding to the bevelled edges 38 for spreading the oil over the opposed surfaces of the washers.

120 is a pin carried by the quill and engaging a slot 121 in the sleeve 116 to prevent the sleeve from turning and also to keep the oil passage 115 in proper registration with the oil inlet 114.

122 is a pin carried by the quill and engaging a slot 123 in the thrust washer 113 to prevent the latter from turning and also to keep the washer 113 in proper position relative to the sleeve 116 so that the oil passage 117 will be in proper registration with the passage 115 in the sleeve.

The slot 123 in the thrust washer 113 not only receives the pin 122 but also serves as an oil passage to permit oil from the opposed faces of the washers 110, 113 and 112 respectively to reach the passage 124 leading to the sump 125.

Oil from the spiral groove 104 in the spindle is adapted to flow through an annular space 126 of L cross-section to the slot 123 in the thrust bearing 113 and thence to the passage 124 leading to the sump 125.

127 is an inlet for oil to the sump 125, and 128 is a ring loose on the spindle B' to facilitate transfer of oil from the sump to the spiral grooves 104 and 105.

129 is an annular recess in the sleeve 130 for the bearing 131 for receiving oil from the spiral groove 105, and 132 is a passage for conducting the oil from the recess 129 to the sump 125.

133 is an annular rib on the spindle B' for throwing or slinging oil in the recess 129 to prevent it from escaping through the clearance between the sleeve 130 and head 108 of the spindle.

In use, the modification illustrated in Figures 5 to 7 inclusive may be mounted by any suitable means (not shown) upon or within a frame or housing of the machine in which it is to be used. After a drive pulley (not shown) is mounted upon the end portion 107 of the spindle, and a chuck or work holder (not shown) is attached to the head 108 of the spindle, the rotation of the spindle may be effected so that the work may be engage by the desired tool to obtain the proper boring, turning, facing, or grinding action. While the spindle B' is rotating, oil may be supplied to the inlets 114 and 127 of the lubricating system so that the rotation of the spindle will be smooth, as aforesaid.

What I claim as my invention is:

1. A spindle assembly having a housing, a spindle rotatable in said housing and having a reduced endwise extension and a shoulder at the inner end of said extension, spaced washers on said extension, one engaging said shoulder, an abutment for the other of said washers on said extension, a spacing washer for said spaced washers on said extension, a thrust washer encircling the spacing washer between said spaced washers and held against turning movement relative to said housing, a single key extending lengthwise of the extension and operable to hold the spaced and spacing washers aforesaid against turning movement relative to said extension, and means on the extension holding said washers in assembled relation with said key.

2. A spindle assembly having a housing, a spindle rotatable in said housing and having a reduced endwise extension provided with longitudinally spaced abutments, one being adjustable, spaced washers on said extension between and bearing against said abutments, a spacing washer for said spaced washers on said extension, a thrust washer encircling the spacing washer between said spaced washers and held against turning movement relative to said housing, and a single key extending lengthwise of the extension and operable to hold the spaced and spacing washers aforesaid against turning movement relative to said extension.

3. A spindle assembly having a housing, a spindle rotatable in the housing and having a reduced endwise extension and a shoulder at the inner end of said extension, a power transmitting element keyed to said extension, spaced washers keyed to said extension between the power transmitting element and shoulder, a spacing washer for said spaced washers keyed to said extension, a collar encircling one of said spaced washers and connected to said housing, and a thrust washer encircling the spacing washer between said spaced washers and clamped between the collar and housing.

4. A spindle assembly having a housing, a spindle rotatably supported in the housing and having axially spaced shoulders, a pair of washers on the spindle between the shoulders, an annular spacer on the spindle between the washers for spacing said washers axially of said spindle, a thrust disc supported between the washers in concentric relation to the spacer and having an internal diameter sufficiently greater than the outside diameter of the spacer to provide an annular space for lubricant, and means for conducting lubricant to said annular space.

5. A spindle assembly having a housing, a spindle rotatably supported in the housing and having axially spaced shoulders, a pair of washers on the spindle between the shoulders, an annular spacer on the spindle between the washers for spacing said washers axially of said spindle, a thrust disc supported between the washers in concentric relation to the spacer and having an internal diameter sufficiently greater than the outside diameter of the spacer to provide an annular space for lubricant, said thrust disc having grooves in opposite sides extruding radially outwardly from said annular space and cooperating with the adjacent sides of the said pair of washers to provide pockets for lubricant, and means for conducting lubricant to said annular space.

6. A spindle assembly having a housing, a spindle rotatably supported in the housing and having axially spaced shoulders, a pair of washers on the spindle between the shoulders, an annular spacer on the spindle between the washers for spacing said washers axially of said spindle, a thrust disc supported between the washers in concentric relation to the spacer and having an internal diameter sufficiently greater than the outside diameter of the spacer to provide an annular space for lubricant, the outside diameter of the thrust disc being greater than the corresponding diameters of the washers and said disc having circumferentially spaced grooves in opposite sides extending radially outwardly from said annular space to the periphery of the washers, said grooves cooperating with the adjacent surfaces of the washers to provide pockets for lubricant, and means for conducting lubricant to said annular space.

7. A spindle assembly having a housing, a spindle rotatably supported in the housing and having axially spaced shoulders, a pair of washers on the spindle between the shoulders, an annular spacer on the spindle between the washers for spacing said washers axially of said spindle, a thrust disc supported between the washers in concentric relation to the spacer and having an internal diameter sufficiently greater than the outside diameter of the spacer to provide an annular space for lubricant, said thrust disc having grooves in opposite sides extending radially outwardly from said annular space and having the surfaces bordering the grooves beveled to provide with the adjacent surfaces of the washers pockets of substantial area for lubricant, and means for conducting lubricant to the annular space.

8. A spindle assembly having a housing, a spindle rotatably supported in the housing and having axially spaced shoulders, a pair of washers on the spindle between the shoulders, an annular spacer on the spindle between the washers for spacing said washers axially of said spindle, a thrust disc supported between the washers in concentric relation to the spacer and having an internal diameter sufficiently greater than the outside diameter of the spacer to provide an annular space for lubricant, the outside diameter of the thrust disc being greater than the corresponding diameters of the washers and said disc having circumferentially spaced grooves in opposite sides extending radially outwardly from said annular space to the periphery of the washers and having the surfaces bordering the grooves beveled to form with the adjacent surfaces of the washers pockets of substantial area for lubricant, means for conducting lubricant to the annular space, means for securing said disk to said housing and means for securing the washers and spacer to the spindle.

9. A spindle assembly comprising a housing, a spindle rotatably supported in the housing, a pair of washers keyed to said spindle, an annular spacer keyed to said spindle, means rigidly retaining said washers and spacer in abutting relation and against axial movement on said spindle, said spacer being of substantially less outside diameter than said washers, an annular thrust washer fixed to said housing and extending into the space between said pair of washers, the inside diameter of said thrust washer being greater than the outside diameter of said spacer so as to provide an annular space for lubricant, means for conducting lubricant to said annular space, the overlapping portions of said thrust washer and said pair of washers providing cooperating pairs of bearing surfaces.

10. A spindle assembly comprising a housing, a spindle rotatably supported in the housing, a pair of washers keyed to said spindle, an annular spacer keyed to said spindle, means rigidly retaining said washers and spacer in abutting relation and against axial movement on said spindle, said spacer being of substantially less outside diameter than said washers, an annular thrust washer fixed to said housing and extending into the space between said pair of washers, the inside diameter of said thrust washer being greater than the outside diameter of said spacer so as to provide an annular space for lubricant, means for conducting lubricant to said annular space, the overlapping portions of said thrust washer and said pair of washers providing cooperating pairs of bearing surfaces, one surface of at least one of said pairs of bearing surfaces being provided with generally radial grooves extending from said annular space substantially throughout the overlapping extent of said bearing surfaces so as to provide substantially closed pockets for lubricants communicating with said annular space.

11. A spindle assembly comprising a housing, a spindle rotatably supported in the housing, a pair of washers keyed to said spindle, an annular spacer keyed to said spindle, means rigidly retaining said washers and spacer in abutting relation and against axial movement on said spindle, said spacer being of substantially less outside diameter than said washers, an annular thrust washer fixed to said housing and extending into the space between said pair of washers, the inside diameter of said thrust washer being greater than the outside diameter of said spacer so as to provide an annular space for lubricant, means for conducting lubricant to said annular space, the overlapping portions of said thrust washer and said pair of washers providing cooperating pairs of bearing surfaces, one surface of at least one of said pairs of bearing surfaces being provided with generally radial grooves extending from said annular space substantially throughout the overlapping extent of said bearing surfaces so as to provide substantially closed pockets for lubricants communicating with said annular space, the bearing surface adjacent said grooves being beveled outwardly from said grooves.

GEORGE F. YAGER.

REFERENCES CITED

The following references are of record in the file of this patent:

UNITED STATES PATENTS

| Number | Name | Date |
| --- | --- | --- |
| 2,249,843 | Marsland | July 22, 1941 |
| 1,557,524 | Hanson | Oct. 13, 1925 |
| 1,619,995 | Turner | Mar. 8, 1927 |
| 2,001,823 | Knowlton | May 21, 1935 |
| 2,229,237 | Brenkert | Jan. 21, 1941 |
| 2,046,092 | Rosendahl | June 30, 1936 |
| 2,271,741 | Mansfield | Feb. 3, 1942 |
| 2,325,404 | Irons | July 27, 1943 |
| 2,085,240 | Walgren et al. | June 29, 1937 |
| 2,081,063 | Oliver | May 18, 1937 |

FOREIGN PATENTS

| Number | Country | Date |
| --- | --- | --- |
| 528,443 | Great Britain | Oct. 29, 1940 |
| 197,369 | Switzerland | July 16, 1938 |
| 33,640 | Austria | July 10, 1908 |
| 397,790 | Germany | July 2, 1924 |